(12) United States Patent  
Nakamura et al.

(10) Patent No.: US 8,444,329 B2
(45) Date of Patent: May 21, 2013

(54) CAMERA MOUNTING STRUCTURE, CAMERA MOUNTING METHOD AND EXTERIOR PANEL COMPONENT OF A VEHICLE

(75) Inventors: Akihiro Nakamura, Saitama (JP); Eiji Oba, Tokyo (JP)

(73) Assignee: Sony Corporation, Tokyo (JP)

( * ) Notice: Subject to any disclaimer, the term of this patent is extended or adjusted under 35 U.S.C. 154(b) by 1230 days.

(21) Appl. No.: 12/266,688

(22) Filed: Nov. 7, 2008

(65) Prior Publication Data

US 2009/0122141 A1   May 14, 2009

(30) Foreign Application Priority Data

Nov. 9, 2007  (JP) ................ P2007-291469

(51) Int. Cl.
*G03B 17/00*  (2006.01)
*G03B 17/48*  (2006.01)
*H04N 7/18*  (2006.01)
*H04N 5/225*  (2006.01)

(52) U.S. Cl.
USPC ............ 396/419; 396/429; 348/148; 348/373

(58) Field of Classification Search
USPC ................ 396/419, 427, 429; 348/148, 373, 348/374; 340/937
See application file for complete search history.

(56) References Cited

U.S. PATENT DOCUMENTS

2008/0231744 A1* 9/2008 Khanna et al. ............... 348/373
2011/0249120 A1* 10/2011 Bingle et al. ................. 348/148

FOREIGN PATENT DOCUMENTS

| JP | 2004 216976 | 8/2004 |
| JP | 2004 320492 | 11/2004 |
| JP | 2005 178441 | 7/2005 |
| JP | 2006 69276 | 3/2006 |
| JP | 2006 199065 | 8/2006 |
| JP | 2006 232017 | 9/2006 |

* cited by examiner

*Primary Examiner* — Rochelle-Ann J Blackman
(74) *Attorney, Agent, or Firm* — Frommer Lawrence & Haug LLP; William S. Frommer; Ellen Marcie Emas

(57) ABSTRACT

A camera mounting structure for mounting an on-vehicle camera on a vehicle, in which the on-vehicle camera includes an imaging module having a lens and an imaging element, and in an exterior panel component making up an exterior of the vehicle, a bracket part for attaching the imaging module is molded integrally with the exterior panel component as a portion of the exterior panel component.

6 Claims, 15 Drawing Sheets

CAMERA MOUNTING STRUCTURE, CAMERA MOUNTING METHOD AND EXTERIOR PANEL COMPONENT OF A VEHICLE

BACKGROUND OF THE INVENTION

1. Field of the Invention

The present invention relates to a camera mounting structure, a camera mounting method, and an exterior panel component of a vehicle for mounting an on-vehicle camera on the vehicle.

2. Description of Related Art

In recent years, an on-vehicle camera has been mounted on a vehicle for various applications such as a dead angle sensor, a back monitor and so forth.

In a related art on-vehicle camera, a camera body (module part including an imaging element) of the on-vehicle camera is generally attached and fixed to a structural component of a vehicle body or an exterior component of the vehicle by a fastener such as screws through a mounting member supporting the camera body (e.g., refer to Japanese Patent Application Publication No. 2004-216976, Patent Documents 1, Japanese Patent Application Publication No. 2005-178441, Patent Document 2, Japanese Patent Application Publication No. 2006-69276, Patent Document 3).

SUMMARY OF THE INVENTION

Recently, an on-vehicle camera has become widespread, and with this, demand for mounting the same has been drastically increased.

However, as described above, the camera body has been mounted through the mounting member. Therefore, the related art camera mounting structure has not necessarily dealt with the increased demand for mounting appropriately and flexibly for reasons as described below.

While the camera body of the on-vehicle camera is precision equipment, and the fixing thereof to the mounting member is performed by small precision screws, it is not necessarily that a production line, a maintenance site of a vehicle and the like are working environments where the handling of the small precision screws is considered. For this reason and the like, the fixing of the camera body to the mounting member is typically performed as a working process prior to the mounting on the vehicle, and in many cases, as a process after production of the camera body, the camera body and the mounting member are assembled, and then, the camera body and the mounting member in the assembled state are attached and fixed to the relevant vehicle on the production line, the maintenance site or the like of the vehicle. That is, the camera body and the mounting member are assembled on the camera production side, and the camera body and the mounting member in the assembled state are mounted on the vehicle on the manufacturing side or the maintenance side of the vehicle.

However, it is typical for a mounting position of the camera body on the vehicle, a component shape of the vehicle on which the camera body is mounted and the like to differ depending on a vehicle type. Therefore, in the case where the camera body is mounted on the vehicle through the mounting member, the mounting member differing depending on the vehicle type needs to be prepared. That is, on the camera manufacturing side, the need to prepare a mounting member for each vehicle type arises.

This means that work for supporting each vehicle type (e.g., component design, manufacturing, management and the like for each vehicle type) is required redundantly on the camera manufacturing side and on the vehicle manufacturing side, which is not preferable in terms of working efficiency. Particularly, under a situation where supporting various vehicle types is required with increased demand for camera mounting, this can be a major issue. In addition, when the work for supporting the vehicle type is required redundantly, this can be an inhibitory factor in assuring versatility of supporting the relevant vehicle type. In light of these, the related art camera mounting structure cannot appropriately deal with the increased demand for mounting the camera in terms of efficiency, and it can also be the that it lacks flexibility in that there is a possibility of impairing the versatility.

Consequently, according to embodiments of the present invention, it is desirable to provide a camera mounting structure, a camera mounting method and an exterior panel component of a vehicle capable of appropriately and flexibly dealing with increased demand for mounting an on-vehicle camera.

An embodiment of the present invention is a camera mounting structure devised to realize the above-described desire. That is, the present invention provides a camera mounting structure for mounting an on-vehicle camera on a vehicle, in which the on-vehicle camera includes an imaging module having a lens and an imaging element, and for an exterior panel component making up an exterior of the vehicle, a bracket part for attaching the imaging module is molded integrally with the exterior panel component as a portion of the exterior panel component.

In the camera mounting structure constituted as described above, since the imaging module is directly attached to the bracket part formed in the exterior panel component, an additional attaching member or the like is not required in the attachment. Furthermore, since the bracket part is molded integrally with the exterior component, when a shape of the exterior panel component is different, a shape of the bracket part can be made different. That is, even if various vehicle types are handled, only the exterior panel component with which the bracket part is molded integrally needs to be prepared for each vehicle type, and the imaging module can be used in common to each vehicle type.

According to an embodiment of the present invention, since the preparation of the exterior panel component with which the bracket part is molded integrally allows the mounting of the on-vehicle camera to the vehicle without requiring any additional attaching member or the like, redundant work (e.g., component design, manufacturing, management and the like for each vehicle type) between the camera manufacturing side, and the vehicle manufacturing side and the like is not required, so as compared with the case where the redundant work is required, working efficiency is largely improved. In addition, versatility assurance in supporting each vehicle type becomes easy. Accordingly, the increased demand for mounting the on-vehicle camera can be dealt with appropriately and flexibly.

DETAILED DESCRIPTION OF THE EMBODIMENTS

Hereinafter, a camera mounting structure, a camera mounting method and an exterior panel component of a vehicle according to an embodiment of the present invention are described with reference to the drawings.

An embodiment of the present invention is intended to mount an on-vehicle camera to a vehicle.

Here, an "on-vehicle camera" is a generic term of a camera apparatus used in a state mounted on a vehicle, the application and the mounting position of which are not limited. That is, the on-vehicle camera is used for a dead angle sensor and a back monitor, and other various applications, and thus, is used by being mounting on a side part, a front part, or a back part of the vehicle.

Moreover, a "vehicle" refers to a car under the Road Traffic Law, particularly a four-wheeled automobile. It, however, is not limited to this, but a body of a train, an electric train or the like (railroad vehicle), self-propelled construction machinery (construction vehicle), self-propelled agricultural machinery (agricultural vehicle) and the like are included in the "vehicle" herein.

In the following description, a back camera mounted on a rear garnish part for a license plate of a four-wheeled automobile (hereinafter, only refer to as "rear garnish"), as a back monitor is described as an example.

First, the on-vehicle camera itself is described.

FIG. 1 is an explanatory view showing one example of a schematic constitution of the on-vehicle camera.

Figure 1A:
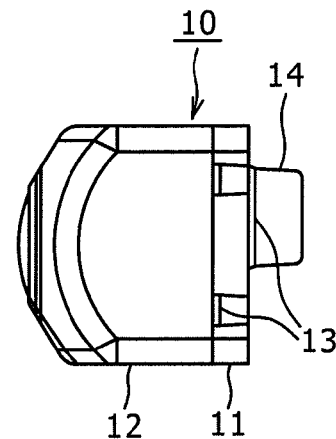
FIG. 1 is explanatory views showing one example of a schematic constitution of an on-vehicle camera.
Figure 1B:
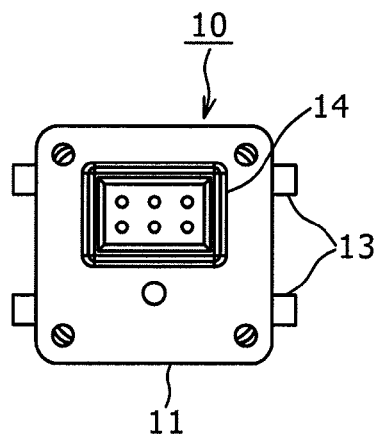
Figure 1C:
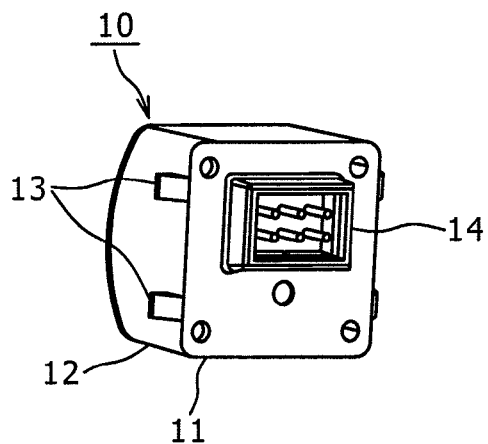
Figure 1D:
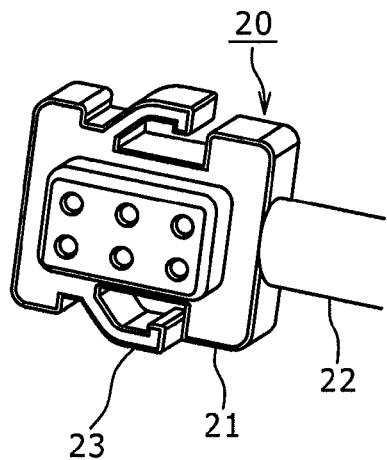
Figure 1E:
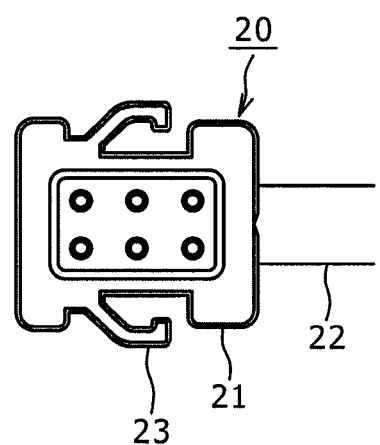

The on-vehicle camera is constituted by roughly including an imaging module 10 shown in FIGS. 1(a) to 1(c), a cable part 20 shown in FIGS. 1(d) to 1(e), and a signal processor not shown.

The imaging module 10 has a lens and an imaging element necessary for capturing an image. More particularly, it includes the lens and the imaging element (neither is shown), a base portion 11 on which these are mounted, and a cover portion 12 that covers these. For the lens and the imaging element, those in publicly known technology, such as a CCD (Charge Coupled Device), may be utilized, and thus, their detailed description is omitted here.

Among these portions, the base portion 11 is provided with projected claw portions 13 used for attaching and fixing the imaging module 10 in such a manner that they are assigned in four positions on a periphery of side end edges of the base portion 11, for example, details of which will be described later. However, a shape, formation positions and the like thereof are not particularly limited, as long as they enable the attachment and fixing of the imaging module 10.

Moreover, on a rear surface side of the base portion 11, that is, on a back surface side of the imaging module 10, a connector receptacle 14 in which electric connection to the imaging element is assured is formed. The connector receptacle 14 is to be coupled to a connector plug 21 of the cable part 20 described later to make up one connector. That is, the connector receptacle 14 corresponds to a connector part on the side mounted on an equipment body in the one connector. While in the illustrated example, a case where the connector receptacle 14 has pin-like terminals is shown, this is not particularly limited, but may be formed into a socket shape. Moreover, same with applied to the number of the terminals.

The cable part 20 is intended to transmit an imaging signal obtained in the imaging module 10 to the signal processor. For this, the cable part 20 includes the connector plug 21 formed insertably and removably into the connector receptacle 14, and a cable 22 that connects to the connector plug 21 to transmit the image signal obtained in the imaging module 10.

Among these, the connector plug 21 is to be coupled to the connector receptacle 14 to make up one connector. That is, the connector plug 21 corresponds to a connector part on the side mounted on the cable 22 in the one connector. A terminal shape, the number of the terminals and the like are not particularly limited as long as the connector plug 21 can be inserted and withdrawn with respect to the connector receptacle 14.

The connector plug 21 is provided with projected claw portions 23 used for attaching and fixing the connector plug 21, for example, in two opposed positions of side end edges of the connector plug 21, details of which will be described later. A shape, formation positions and the like thereof are not particularly limited, as long as they enable the attachment and fixing of the connector plug 21.

The signal processor performs predetermined signal processing as needed to the imaging signal received through the cable part 20 (A/D conversion, gain adjustment and the like). For the signal processing performed by the signal processor, a circuit configuration necessary for it, and the like, those by publicly known technology may be utilized similarly to those in the related art, and thus, their detailed description is omitted.

Subsequently, the rear garnish, which is a mounting portion of the above-described on-vehicle camera is described.

The rear garnish is one of exterior panel components making up an exterior of the vehicle, and is made of a resin molded component designed and molded for each vehicle type, or the like. However, the rear garnish described as one example here is constituted as described below in order to mount the on-vehicle camera having the above-described constitution, particularly the imaging module 10 and the connector plug 21 in the on-vehicle camera.

Figure 2:
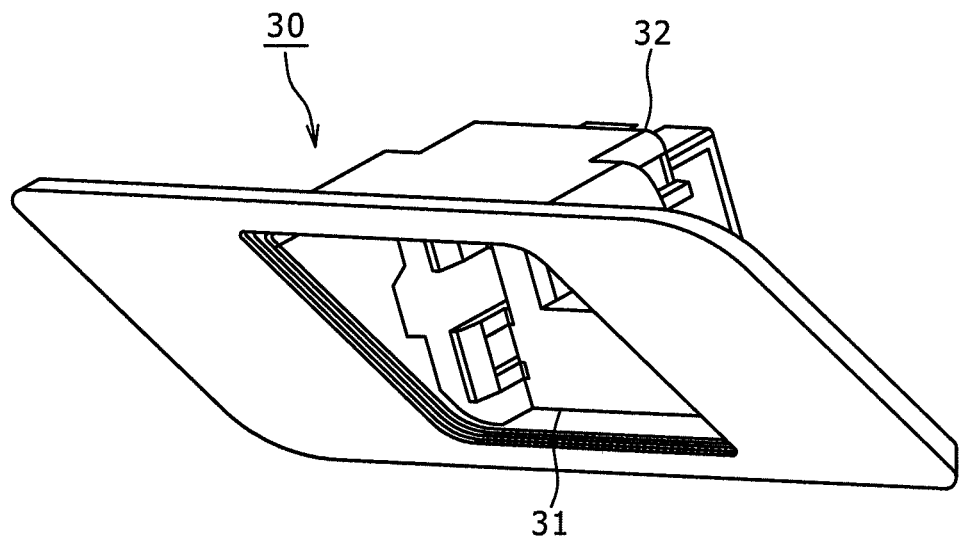
FIG. 2 is an explanatory view showing a schematic constitutional example of a rear garnish.
Figure 3:
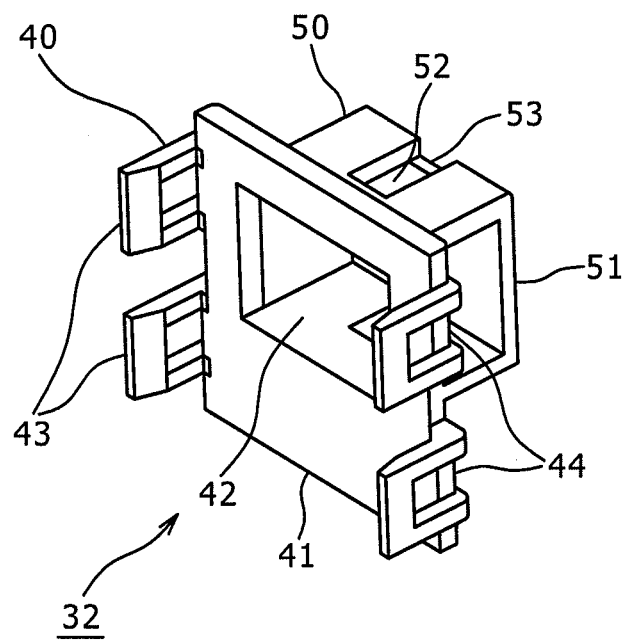
FIG. 3 is an explanatory view showing one example of a constitution of a substantial part of the rear garnish.

FIG. 2 is an explanatory view showing a schematic constitutional example of the rear garnish, and FIG. 3 is an explanatory view showing one example of a substantial constitution thereof.

As shown in FIG. 2, in a rear garnish 30, an opening 31 for mounting the on-vehicle camera is arranged, and a bracket part 32 for mounting the on-vehicle camera is arranged on the back surface side of a portion where the opening 31 is arranged. The bracket part 32 is molded integrally with the rear garnish 30 as a portion of the rear garnish part 30. That is, the rear garnish 30 includes the bracket part 32 for mounting the on-vehicle camera at a portion thereof.

The bracket part 32, as shown in FIG. 3, has a module attaching portion 40 on which the imaging module 10 is attached and fixed, and a connector attaching portion 50 on which the connector plug 21 is attached and fixed. Both of these attaching portions 40, 50, being molded integrally with the rear garnish 30, are formed by resin molding similar to the rear garnish 30.

For attaching and fixing the imaging module 10, the module attaching portion 40 has a base portion 41 on which the base portion 11 of the imaging module 10 is placed, an escape portion 42 for avoiding interference with the connector receptacle 14 of the imaging module 10, and four receiving portions 43 projected from the base portion 41 toward the front side of the rear garnish 30 so as to correspond to the respective claw portions 13 provided in the base portion 11 of the imaging module 10, and a depressed shape portion of each of the receiving portions 43 is configured to engage with the corresponding claw portion 13 (projected portion). Each of the receiving portions 43 only needs to make up a snap-fit latch (for preventing slipping-off) that performs the engagement or engagement release with respect to the claw part 13 utilizing deflection by elastic deformation, and a shape, a size and the like thereof are not particularly limited. With the formation number of the receiving portions 43, they only need to be provided in two or more positions opposed to one another as long as it corresponds to the formation number of the claw portions 13, and enables the attaching and fixing of the imaging module 10.

For attaching and fixing the connector plug 21, the connector attaching portion 50 has a cylindrical holding portion 51 formed on the back surface side of a portion where the relief portion 42 is arranged, into which the connector plug 21 may be inserted, and two receiving portions 52 formed in the holding portion 51 so as to correspond to the respective claw portions 23 provided in the connector plug 21, so that depressed portions of the respective receiving portions 52 may be engaged with the corresponding claw portions 23 (projected portions), respectively. Each of these receiving portions 52, similar to each of the receiving portions 43 in the module attaching portion 40, only needs to make up a snap-fit latch, and a shape, a size and the like thereof are not particularly limited. With the formation number of the receiving portions 52, they only need to be provided in two or more positions opposed to one another as long as it corresponds to the formation number of the claw portions 23, and enables the attachment and fixing of the connector plug 21.

The rear garnish 30 constituted as described above, particularly the bracket part 32 included by the rear garnish 30 and the receiving portions 43, 52 in the bracket part 32 are assumed to have shapes that the rear garnish 30 and the bracket part 32 may be formed by a molding processing of one step. More particularly, the bracket part 32 and the receiving portions 43, 52 each have a shape in which overlapping portions are not present when projected along a demolding direction of a male mold and a female mold, so that they can be molded by only a pair of the female and male molds. More specifically, in order to realize the above-described shapes, the bracket part 32 is formed so as to correspond to (substantially coincide with) a size of the opening 31, and the holding portion 51 is formed so as to correspond to (substantially coincide with) a size of the relief portion 42. Moreover, in the receiving portions 43, notched portions 44 are formed in roots thereof, and similarly, notched portions 53 are also formed in roots of the receiving portions 52.

Now, a procedure for mounting the imaging module 10 and the connector plug 21 of the on-vehicle camera on the above-described rear garnish 30 is described.

Figure 4A:
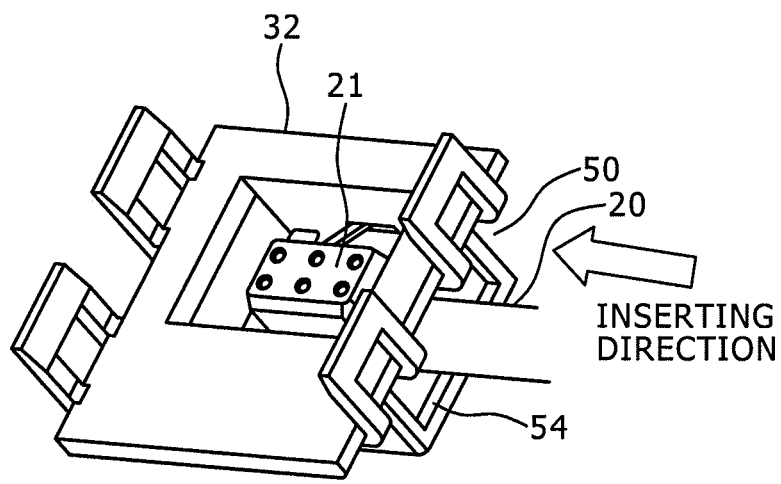
FIG. 4 is explanatory views (No. 1) showing one specific example of an on-vehicle camera mounting procedure.
Figure 4B:
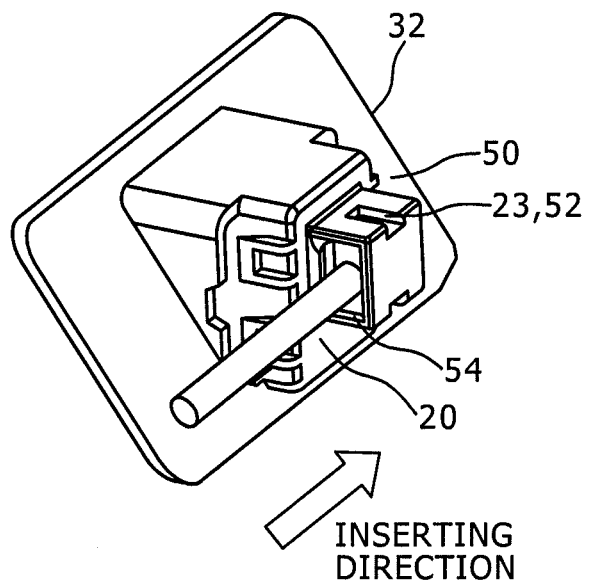
Figure 5:
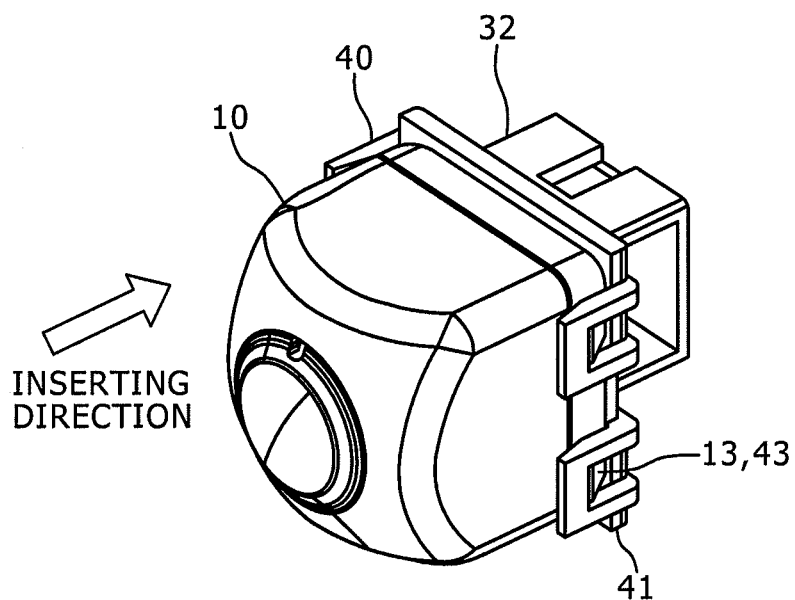
FIG. 5 is an explanatory view (No. 2) showing the one specific example of the on-vehicle camera mounting procedure.
Figure 6:
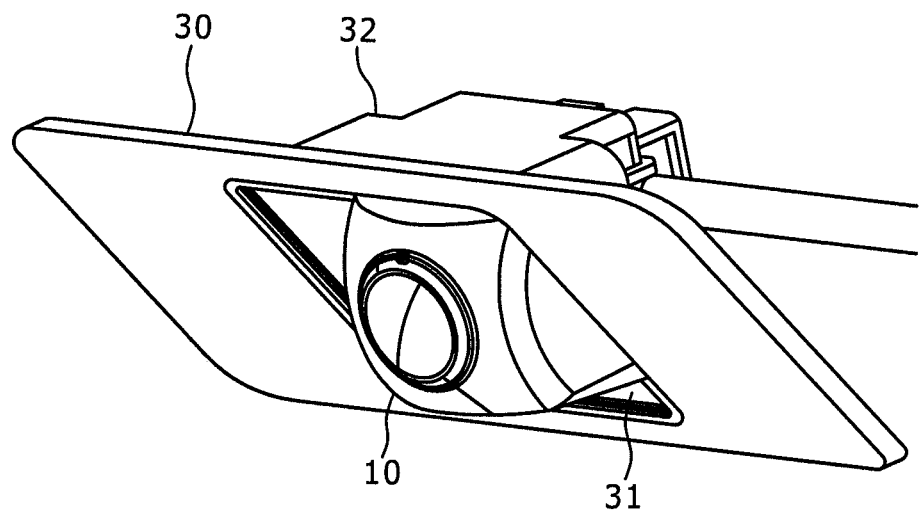
FIG. 6 is an explanatory view (No. 3) showing the one specific example of the on-vehicle camera mounting procedure.
Figure 7A:
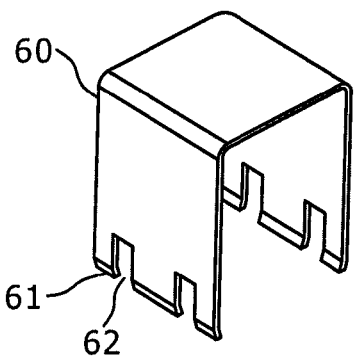
FIG. 7 is explanatory views showing one specific example of a module detaching jig.
Figure 7B:
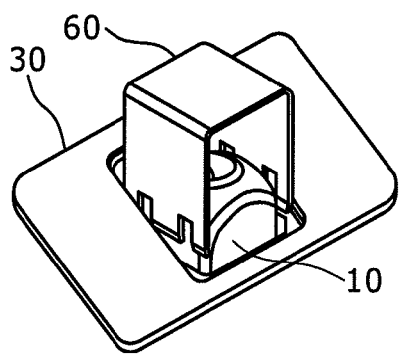
Figure 7C:
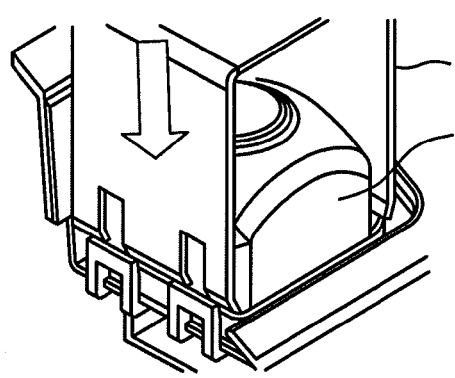
Figure 7D:
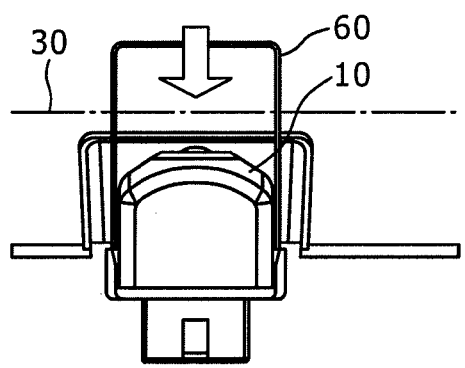
Figure 7E:
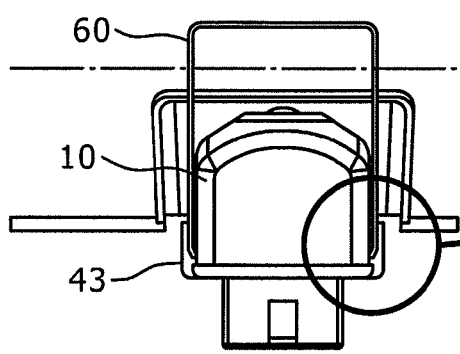
Figure 7F:
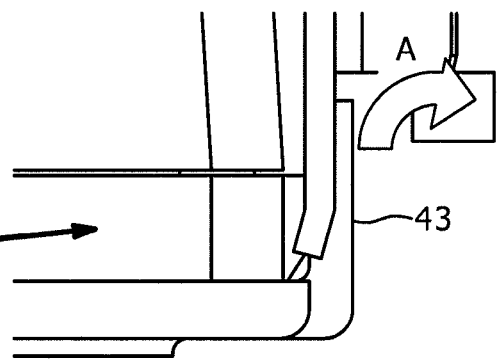
Figure 8:
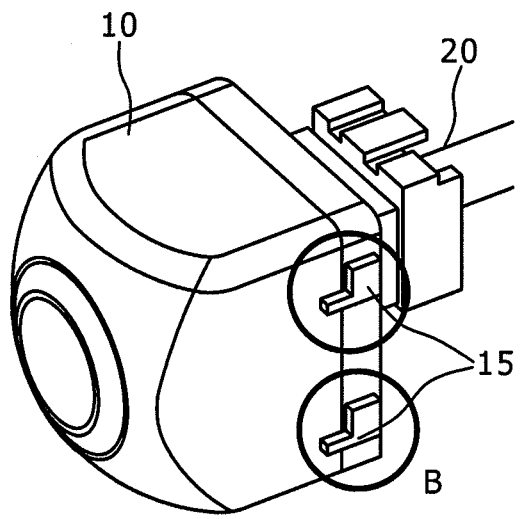
FIG. 8 is an explanatory view (No. 1) showing another example of a constitution of a substantial part of the rear garnish.

FIGS. 4 to 6 are explanatory views showing one specific example of the on-vehicle camera mounting procedure.

In mounting the on-vehicle camera, the attachment and fixing of the connector plug 21 to the connector attaching portion 50 is first performed as shown in FIG. 4. That is, the connector plug 21 is inserted into the holding portion 51 from one end edge side of the cylindrical holding portion 51 in the connector attaching portion 50, that is, from an opening portion 54 formed by the holding portion 51. The claw portions 23 in the connector plug 21 are engaged with the receiving portions 52 in the connector attaching portion 50. This allows the connector plug 21 to be attached and fixed inside of the holding portion 51 of the connector attaching portion 50.

Thereafter, as shown in FIG. 5, the attachment and fixing of the imaging module 10 to the module attaching portion 40 is performed. That is, the imaging module 10 is inserted into the opening 31 from the front side of the rear garnish 30. The claw portions 13 in the imaging module 10 are engaged with the receiving portions 43 in the module attaching portion 40. This allows the imaging module 10 to be attached and fixed in a state where it is placed on the base portion 41 of the module attaching portion 40.

At this time, the connector plug 21 is attached and fixed to the connector attaching portion 50. Thus, once the imaging module 10 is attached and fixed to the module attaching portion 40, accordingly the terminals are mutually engaged and electrically connected between the connector receptacle 14 in the imaging module 10 and the connector plug 21 attached and fixed to the connector attaching portion 50. That is, the bracket part 32 is constituted so that once the imaging module 10 is attached and fixed to the module attaching portion 40 and the connector plug 21 is attached and fixed to the connector attaching portion 50, the connection between the connector receptacle 14 and the connector plug 21 is assured.

Through the procedure as described above, as shown in FIG. 6, the imaging module 10 and the connector plug 21 of the on-vehicle camera are mounted on the rear garnish 30.

In the mounting, since the connector plug 21 is inserted from the opening portion 54 of the holding portion 51, and the imaging module 10 is inserted from the front side of the rear garnish 30, respective insertion directions are perpendicular to each other. That is, the constitution is such that an attachment direction when the imaging module 10 is attached to the module attaching portion 40, and an attachment direction when the connector plug 21 is attached to the connector attaching portion 50 are different from each other.

The attachment and fixing of the imaging module 10 is performed, utilizing the engagement of the claw portions 13 and the receiving portions 43, as described above. Accordingly, the formation of inclined surfaces as guides in the claw portions 13 and the receiving portions 43 allows the attachment and fixing to be performed by so-called one-touch operation without requiring a dedicated tool or the like.

In contrast, it can be considered that the withdrawal of the imaging module 10 from the module attaching portion 40 is performed using a jig as described below. This is because in terms of sureness of the attachment and fixing of the imaging module 10, it is not preferable that there is a possibility that the imaging module 10 is easily detached, and in terms of workability during maintenance of the imaging module 10, it is not preferable that the detachment of the imaging module 10 is difficult.

FIG. 7 is explanatory views showing one specific example of a module detaching jig.

As shown in FIG. 7(*a*), as a module detaching jig 6, there is considered one that is constructed by bending a plate-like metal member into a channel shape (U shape), and has inclined portions 61 as guides at end edge portions and notched portions 62 provided corresponding to the claw portions 13.

When the withdrawal of the imaging module 10 is performed by using the above-described module detaching jig 60, the module detaching jig 60 is first inserted from the front side of the rear garnish 30 as shown in FIGS. 7(*b*) and 7(*c*). Accordingly, in the module attaching portion 40, as shown in FIGS. 7(*d*) to 7(*f*), the receiving portions 43 are pushed outward to be deflected (refer to arrow A in the figure), so that the engaged state between the receiving portions 43 and the claw portions 13 in the imaging module 10 is released. In this state, when the module detaching jig 60 is pulled out, the imaging module 10 is withdrawn from the module attachment portion 40 together with the module detaching jig 60.

The use of the above-described module detaching jig 60 can assure easiness in withdrawal work of the imaging module 10 from the module attaching portion 40 while constructing the shape of the engagement portions between the claw portions 13 and the receiving portions 43 into a shape that prevents the imaging module 10 from being easily disengaged.

Next, another constitutional example of the on-vehicle camera and the rear garnish is described.

FIGS. 8 to 12 are explanatory views showing another example of a substantial constitution of the rear garnish.

Figure 9:
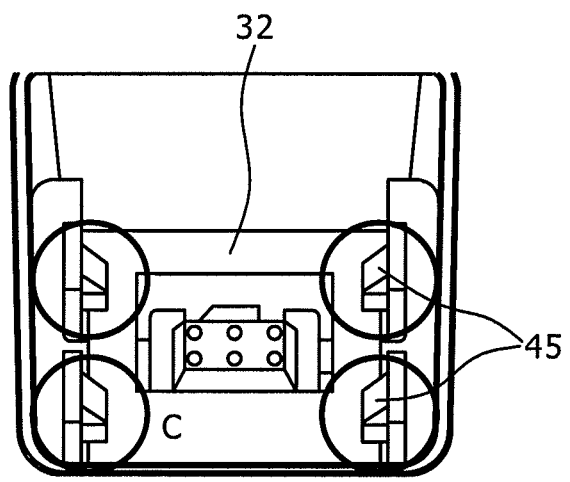
FIG. 9 is an explanatory view (No. 2) showing the another example of the substantial constitution of the rear garnish.

The constitutional example shown in the figures is different from the case of the above-described constitutional example in that depressed receiving portions 15 are provided on the imaging module 10 side (refer to B portions in FIG. 8), and claw portions 45 having projected portions to be engaged with the receiving portions 15 are provided on the module attaching portion 40 side (refer to C portions in FIG. 9). However, this constitutional example is similar to the case of the above-described constitutional example in that the attachment and fixing of the imaging module 10 is performed utilizing the engagement between the claw portions 45 and the receiving portions 15.

This means that the claw portions 13, 45 and the receiving portions 15, 43 may be provided in either of the imaging module 10 or the module attaching portion 40 in the bracket part 32. That is, the constitution may be such that in any one of the imaging module 10 and the module attaching portion 40 in the bracket part 32, the claw portions 13, 45 are provided and in the other, the receiving portions 15, 43 to be engaged with the claw portions 13, 45 are provided, so that the engagement of these allows the imaging module 10 to be attached and fixed to the module attaching portion 40.

Moreover, in the constitutional example shown in the figures, a cable extending direction in the cable part 20 is different from that in the case of above-described constitutional example. That is, this constitutional example is different from the case of the above-described constitutional example in which the inserting and withdrawing direction and the extending direction are substantially perpendicular to each other, in that the cable 22 extends along the inserting and withdrawing direction of the connector plug 21 with respect to the connector receptacle 14 (refer to FIG. 8).

Figure 10A:
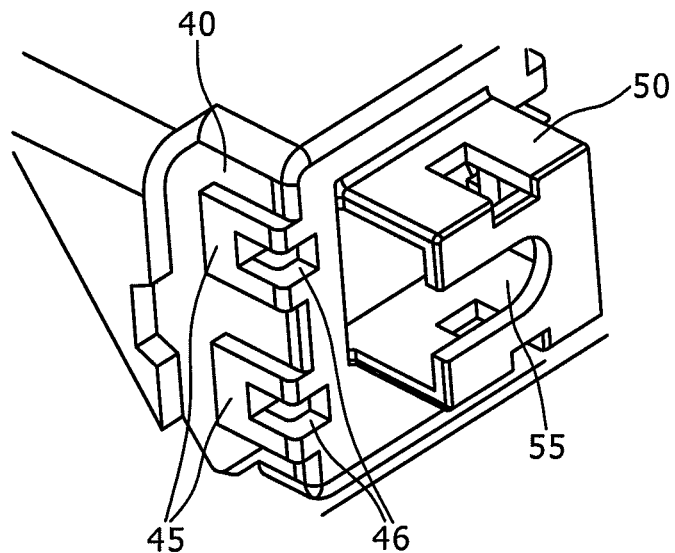
FIG. 10 is explanatory views (No. 3) showing the another example of the substantial constitution of the rear garnish.
Figure 10B:
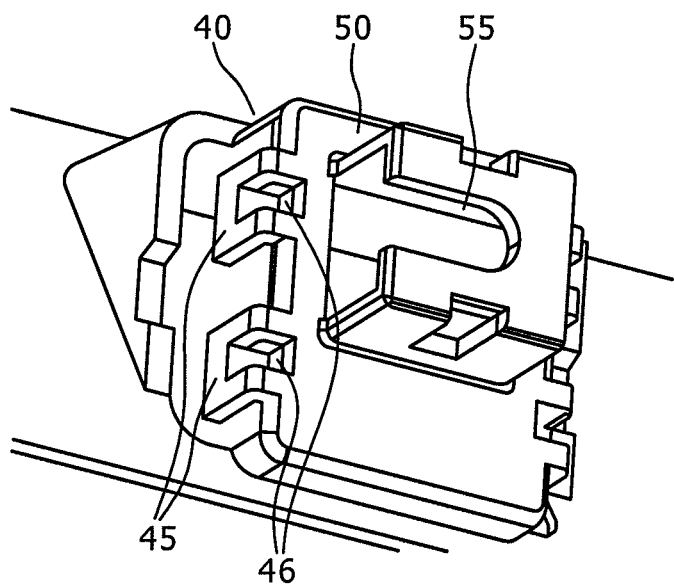
Figure 11A:
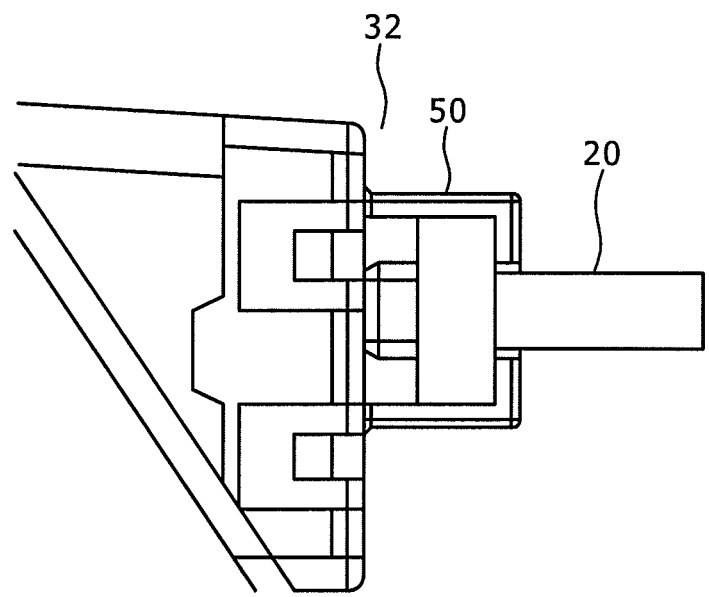
FIG. 11 is explanatory views (No. 4) showing the another example of the substantial constitution of the rear garnish.
Figure 11B:
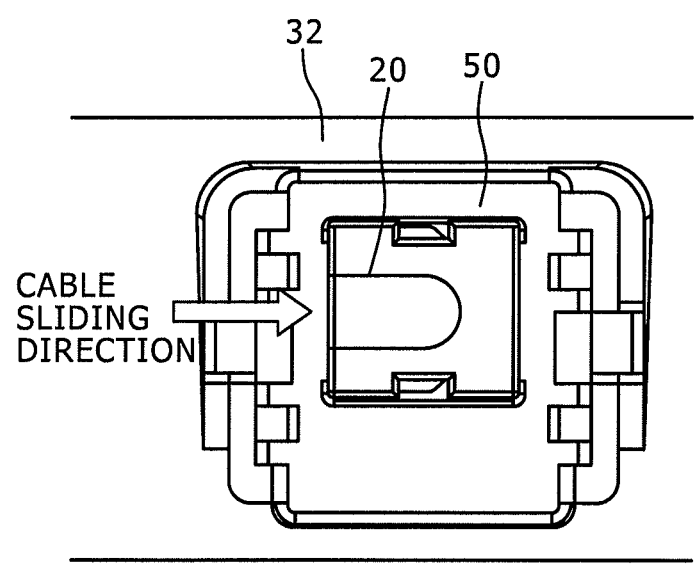
Figure 12A:
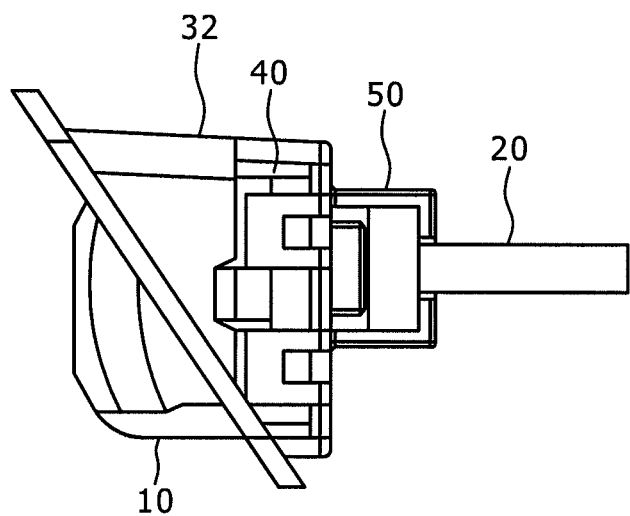
FIG. 12 is explanatory views (No. 5) showing the another example of the substantial constitution of the rear garnish.
Figure 12B:
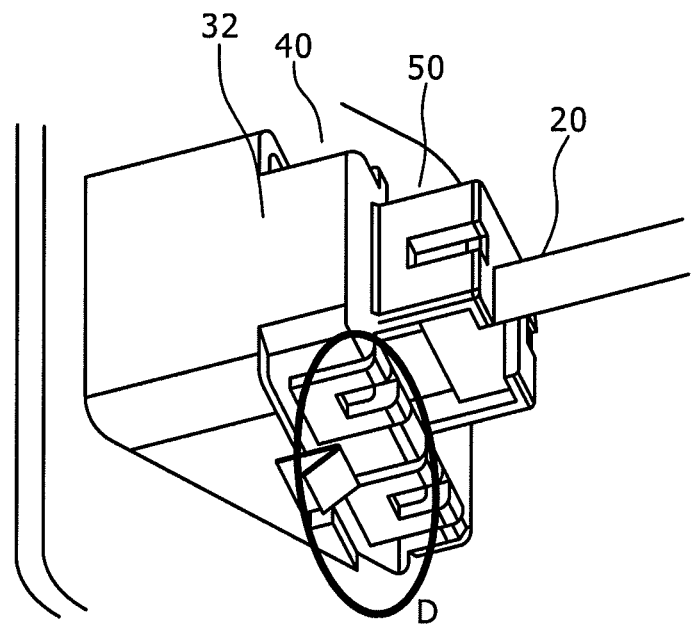

Thus, in the connector attaching portion 50 of the bracket part 32, the holding portion 51 into which the connector plug 21 is inserted is formed with an escape portion 55 corresponding to the extending direction of the cable 22 (refer to FIG. 10). The inserting direction of the connector plug 21 is similar to that in the case of the above-described constitutional example.

Furthermore, in constitutional example shown in the figures, the bracket part 32 and the claw portions 45 in the bracket part 32 also have shapes that enables the rear garnish 30 and the bracket part 32 to be formed by a molding processing of one step. More specifically, in the base portion 41 in the module attaching portion of the bracket part 32, notched portions 46 in accordance with a projected amount of the projected portions in the claw portions 45 are formed (refer to FIG. 10).

In the above-described constitutional example, similar to the case of the constitutional example described before, the bracket part 32 to which the imaging module 10 and the connector plug 21 are attached and fixed is molded integrally with the rear garnish 30 as a portion of the rear garnish 30. Once the imaging module 10 is attached and fixed to the module attaching portion 40, and the connector plug 21 is attached and fixed to the connector attaching portion 50, the connection between the connector receptacle 14 and the connector plug 21 is arranged to be assured (refer to FIGS. 11 and 12).

While, here, the case where the depression and projection relation in the engagement portions (i.e., claw portions 45 and the receiving portions 15) for attaching and fixing the imaging module 10 to the module attaching portion 40 (refer to a D portion in FIG. 12) is reverse to that of the constitutional example described before is taken as an example, the same is also applied to the depression and projection relation in the engagement portions for attaching and fixing the connector plug 21 to the connector attaching portion 50. That is, the constitution may be such that any one of the connector plug 21 and the connector attaching portion 50 in the bracket part 32 is provided with the claw portions and the other is provided with the receiving portions to be engaged with the claw portions, so that the mutual engagement of these allows the connector plug 21 to be attached and fixed to the connector attaching portion 50.

Next, still another constitutional example of the on-vehicle camera and the rear garnish is described.

Figure 13A:
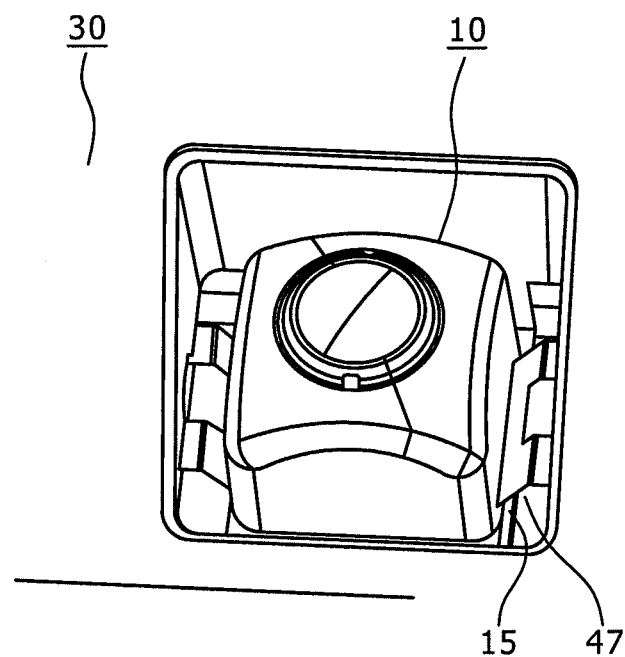
FIG. 13 is explanatory views (No. 1) showing still another example of the substantial constitution of the rear garnish.
Figure 13B:
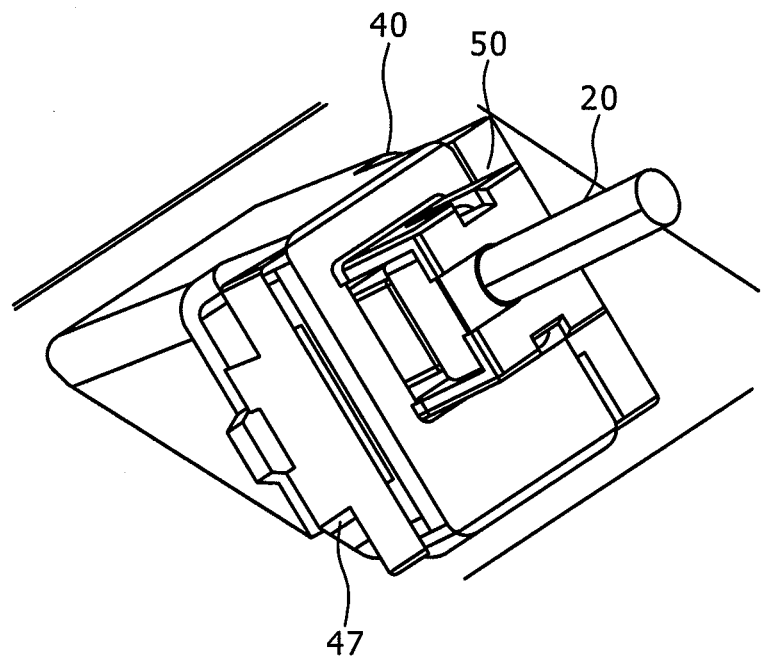
Figure 14A:
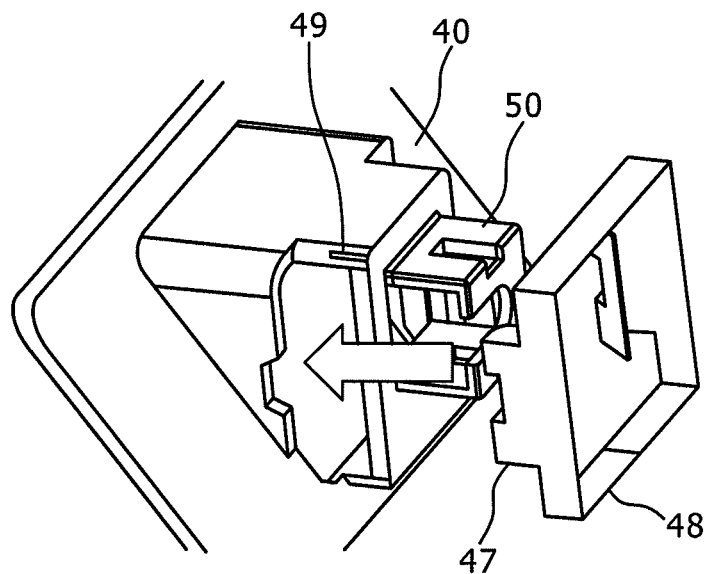
FIG. 14 is explanatory views (No. 2) showing the still another example of the substantial constitution of the rear garnish.
Figure 14B:
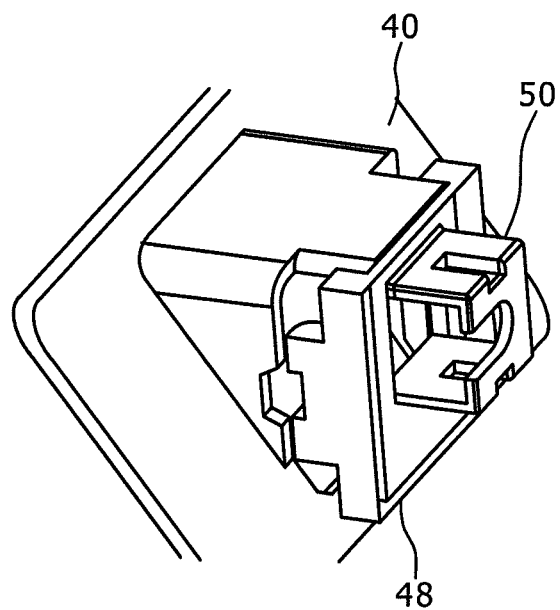
Figure 15A:
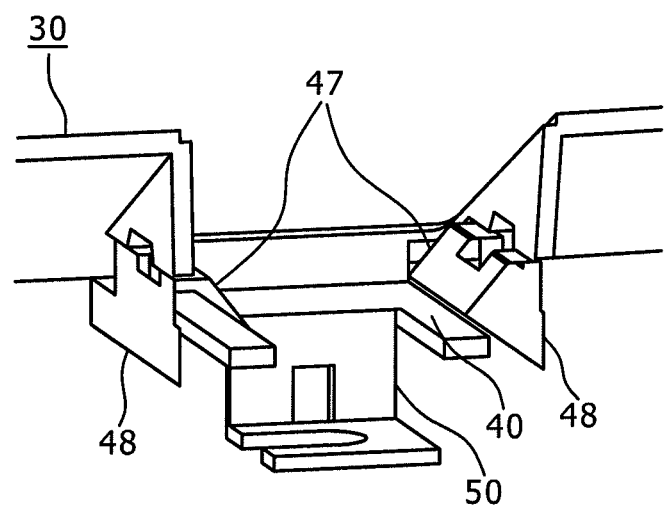
FIG. 15 is explanatory views (No. 3) showing the still another example of the substantial constitution of the rear garnish.
Figure 15B:
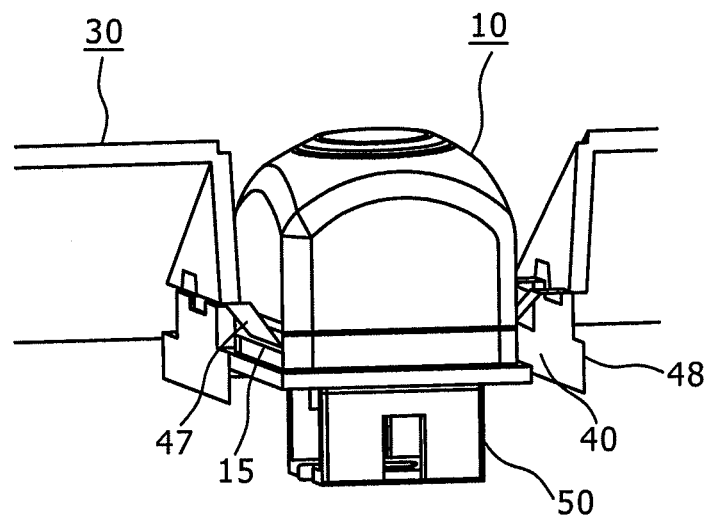

FIGS. 13 to 15 are explanatory views showing still another example of a substantial constitution of the rear garnish.

As shown in FIG. 13, while in the constitutional example described here, similar to the above-described constitutional example (e.g., refer to FIG. 12), the engagement between the depressed receiving portions 15 in the imaging module 10 and claw portions 47 each having a projected shape is utilized to attach and fix the imaging module 10, this constitutional example is different from the case of the above-described constitutional example in that the claw portions 47 to be engaged with the receiving portions 15 are provided separately from the module attaching portion 40 in the bracket part 32.

More particularly, as shown in FIG. 14(a), an auxiliary member 48 is formed in which the claw portions 47 are formed in opposed side portions of a rectangular frame respectively by applying bending processing to a thin-plate metal member, and in the module attaching portion 40 in the bracket part 32, groove portions 49 into which opposed side portions of the auxiliary member 48 with the claw portions 47 not formed are engaged are formed. As shown in FIG. 14(b), by engaging the opposed side portions of the auxiliary member 48 with the claw portions 47 not formed into the groove portions 49, the claw portions 47 owned by the auxiliary member 48 has serve the function similar to that of the claw portions 45 in the above-described constitutional example (e.g., refer to FIG. 10).

Accordingly, as shown in FIG. 15, in the constitutional example, similar to the case of the above-described constitutional example (e.g., refer to FIGS. 8 to 12), once the imaging module 10 is attached to the module attaching portion 40 in the bracket part 32, the engagement between the claw portions 47 and the receiving portions 15 allows the imaging module 10 to be fixed. That is, the imaging module 10 and the connector plug 21 are attached and fixed to the bracket part 32 molded integrally with the rear garnish 30 as a portion of the rear garnish 30, and the attachment and fixing assures the connection between the connection receptacle 14 and the connector plug 21.

In addition, in the constitutional example taken as an example here, since the claw portions 47 are provided separately from the module attaching portion 40, the simplification of the shape of the module attaching portion 40 can be realized. Moreover, since they are provided separately, for example, even if the claw portion 47 is damaged, by replacing the auxiliary member 48, easy and flexible handling can be realized. Furthermore, depending on the selection of forming materials, formed plate thickness or the like of the auxiliary member 48, appropriate adjustment of holding force in the engaged state by the claw portions 47 (attachment and fixing force of the imaging module 10) can also be realized.

In any case of the above-described constitutional examples, the bracket part 32 is molded integrally with the rear garnish 30 as a portion of the rear garnish 30. That is, the bracket part 32 cannot be detached from the rear garnish 30.

On the other hand, not all vehicles to which the rear garnish 30 is attached require the mounting of the on-vehicle camera. That is, among the vehicles to which the rear garnish 30 is attached, there can exist ones that do not require the mounting of the on-vehicle camera.

Thus, it can be considered that an exterior cover as described below is attached in a formation position of the bracket part 32 in the rear garnish 30.

Figure 16:
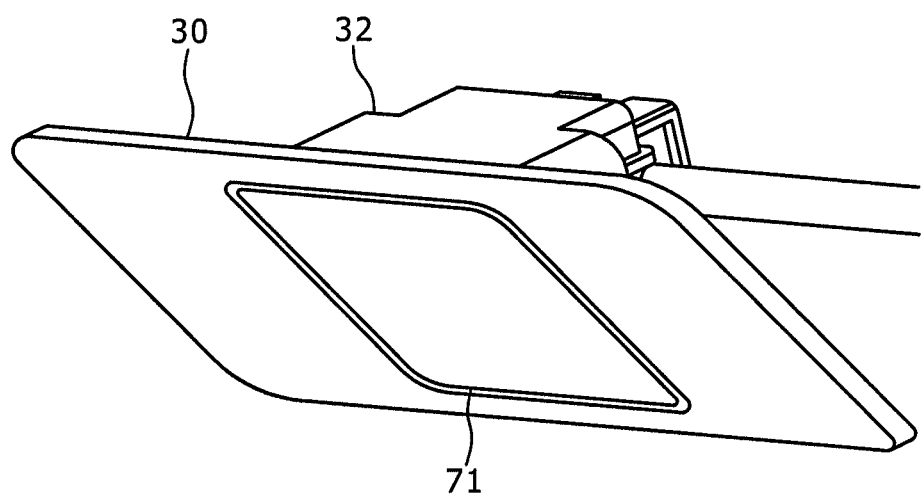
FIG. 16 is an explanatory view showing one specific example of an exterior cover.

FIG. 16 is an explanatory view showing one specific example of the exterior cover.

As illustrated in the figure, an exterior cover 71 functions as a so-called blank cap that covers the formation portion of the bracket part 32 to shut when the mounting of the on-vehicle camera is not performed. For this, the exterior cover 71 is configured to have a panel portion of the same color as, and flat with an exterior portion of the rear garnish 30. It is considered that the attachment of this exterior cover 71 to the rear garnish 30 can be performed by one-touch operation using a snap-fit latch (for preventing slipping-off) utilizing the engagement between claw portions and receiving portions, similar to the attachment and fixing of the imaging module 10 to the rear garish 30.

Moreover, the exterior cover may be attached not only when the mounting of the on-vehicle camera is not performed but also when the mounting of the on-vehicle camera is performed.

Figure 17:
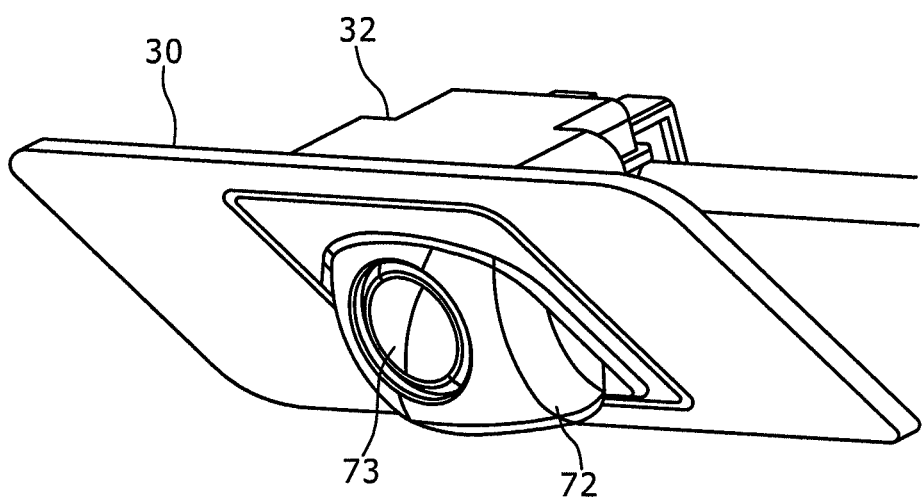
FIG. 17 is an explanatory view showing another specific example of an exterior cover.

FIG. 17 is an explanatory view showing another specific example of the exterior cover.

An illustrated exterior cover 72 is attached when the mounting of the on-vehicle camera is performed. For this, in the exterior cover 72, an opening 73 for exposing only a lens that the imaging module 10 has is formed, and a portion other than the opening 73 is configured in the same color as that of the exterior portion of the rear garnish 30. The attachment of the above-described exterior cover 72 can make inconspicuous the existence of on-vehicle camera, particularly, the existence of the imaging module 10 making up the on-vehicle camera even when the mounting of the on-vehicle camera is performed. It is considered that the attachment of this exterior cover 72 to the rear garnish 30 can be performed by one-touch operation using a snap-fit latch, as in the case of the above-described specific example.

It is also considered that when the exterior cover 72 is attached in mounting the on-vehicle camera in this manner, deformation-movement restraining means as described below is formed in the exterior cover 72. The deformation-movement restraining means is intended to restrain a situation where the receiving portions 43 or the claw portions 45 for attaching and fixing the imaging module 10 are deflected by elastic deformation so that the engagement portions with the claw portions 13 or the receiving portions 15 are moved, and to prevent the image module 10 from slipping off from the module attaching portion 40 in advance.

Figure 18:
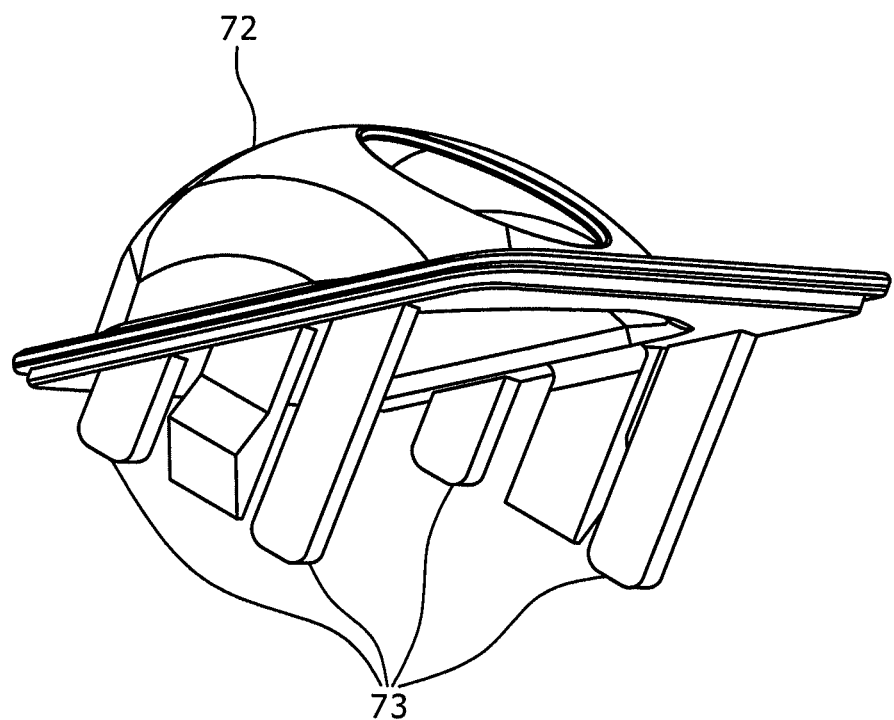
FIG. 18 is an explanatory view (No. 1) showing one specific example of deformation-movement restraining means.

FIGS. 18 and 19 are explanatory views showing one specific example of the deformation-movement restraining means.

As shown in FIG. 18, as the deformation-movement restraining means, rib-shaped portions 73 formed so as to be projected from the rear surface side of the exterior cover 72 are cited. These rib-shaped portions 73 are formed, for example, in four positions so as to correspond to the receiving portions 43 for attaching and fixing the imaging module 10.

Figure 19A:
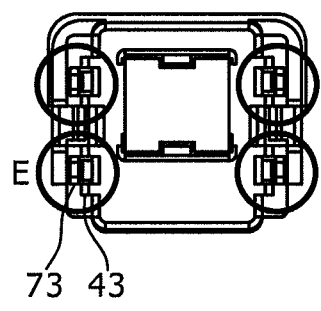
FIG. 19 is explanatory views (No. 2) of the one specific example of the deformation-movement restraining means.
Figure 19B:
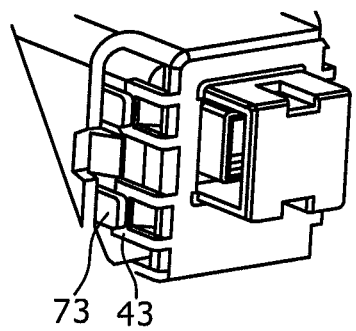
Figure 19C:
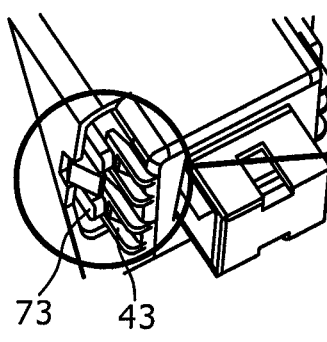

When the exterior cover 72 having the above-described rib-shaped portions 73 is attached to the rear garnish 30, the respective rib-shaped portions 73 are located outside the receiving portions 43, corresponding to the respective receiving portions 43 in the state where the exterior cover 72 is attached, as shown in FIGS. 19(a) to 19(c). That is, the respective rib-shaped portions 73 are arranged in positions where the receiving portions 43 is suppressed from being deflected outward (refer to E portions in the figure).

Figure 19D:
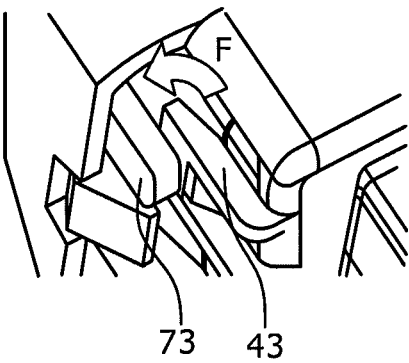

Accordingly, in the state where the exterior cover 72 having the rib-shaped portions 73 is attached to the rear garnish 30, as shown in FIG. 19(d), even if the respective receiving portions 43 are to be deflected outward (refer to an F portion in the figure), the deflection will be restrained by the each of the rib-shaped portions 73 in each of the receiving portions 43, and as a result, the imaging module 10 will be prevented from slipping off from the module attaching portion 40.

As described above, in the camera mounting structure and the camera mounting method in which the mounting of the on-vehicle camera is performed using the rear garnish 30 according to the respective constitutional examples of the present embodiment, in any case of the constitutional examples, since the imaging module 10 making up the on-vehicle camera is directly attached to the bracket part 32 formed in the rear garnish 30, an additional mounting member or the like is not required in the attachment. In addition, since the bracket part 32 is molded integrally with the rear garnish 30, if the shape of the rear garnish 30 is different, the shape of the bracket part 32 can be made different. That is, even in the case of handling various vehicle types, only the rear garnish 30 with which the bracket part 32 is integrally molded needs to be prepared for each vehicle type, while the imaging module 10 can be used in common to various vehicle types.

Accordingly, for example, even under a situation where handling of various vehicle types is required with the increased demand for the camera mounting, the preparation of the rear garnish 30 with which the bracket part 32 is molded integrally for each vehicle type allows the on-vehicle camera to be mounted on the relevant type of vehicle without requiring any additional mounting member or the like. Thus, related art redundant work (e.g., component design, manufacturing, management and the like for each vehicle type) on the camera manufacturing side, and on the vehicle manufacturing side and the like is not required, and working efficiency is largely improved as compared with the case where the redundant work is required. In addition, versatility assurance in supporting the vehicle type also becomes easy.

That is, according to the camera mounting structure and the camera mounting method described in the present embodiment, by eliminating a mounting member specific to each vehicle type or the like, which has been designed for each vehicle type, and providing the function of fixing the camera (the bracket part 32) to the rear garnish 30, the camera fixing function is put together with the exterior panel component of the vehicle to thereby standardize and simplify the on-vehicle camera. This makes component/camera production, distribution and mounting work efficient, and enables the increased demand for mounting the on-vehicle camera to be dealt with appropriately and flexibly.

Furthermore, by employing the camera mounting structure and the camera mounting method described in the embodiment, mounting space of the on-vehicle camera can be assured than the initial stage of the vehicle design, which allows an arrangement layout of the on-vehicle camera to be performed without difficulty. In addition, through the standardization of the on-vehicle camera, stabilization of quality of the on-vehicle camera and reduction in number of components (cost down) can be expected.

Moreover, in the camera mounting structure and the camera mounting method in which the mounting of the on-vehicle camera is performed using the rear garnish 30 according to the respective constitutional examples described in the present embodiment, in any case of the constitutional examples, the constitution is such that the bracket part 32 molded integrally with the rear garnish 30 has the module attaching portion 40 to which the imaging module 10 is attached and fixed, and the connector attaching portion 50 to which the connector plug 21 is attached and fixed. Once the imaging module 10 is attached and fixed to the module attaching portion 40, and the connector plug 21 is attached and fixed to the connector attaching portion 50, the electrical connection between the connector receptacle 14 and the connector plug 21 is assured. That is, not only the imaging module 10 is attached and fixed to the module attaching portion 40 of the bracket part 32, but also the connector plug 21, which can be inserted and withdrawn with respect to the connector receptacle 14 of the imaging module 10, can be attached and fixed to the connector attaching portion 50 of the bracket part 32.

Thus, according to the camera mounting structure and the camera mounting method described in the present embodiment, without fixing the imaging module 10 and the connector plug 21 by adhesion, screw cramp or the like, that is, without assuring space for adhesion, screw cramp or the like between the imaging module 10 and the connector plug 21, sufficient fixing strength of the connector plug 21 can be obtained, and thus, as compared with the case where the space is required, the connection structure of the connector portion can be simplified and dealing with downsizing becomes very easy. In addition, since the connector plug 21 is attached and fixed to the connector attaching portion 50 of the bracket part 32 separately from the imaging module 10, for example, even if excessive load is applied to the cable 22 extending from the connector plug 21, the connector attaching portion 50 receives this, so that this load does not affect the imaging module 10 or the like, and sufficient load bearing strength around the cable can be assured, and in addition, through this, further promotion of easily dealing with the downsizing can be realized.

Namely, in the camera mounting structure and the camera mounting method described in the present embodiment, there is employed a so-called double lock structure in which the attachment and fixing of the imaging module 10 to the module attaching portion 40, and the attachment and fixing of the connector plug 21 to the connector attaching portion 50 are performed separately, and once they are attached and fixed, respectively, the electrical connection between the connector receptacle 14 and the connector plug 21 is assured. Therefore, cable load bearing strength inside a vehicle body of the vehicle is largely improved as compared with the related art structure, which does not employ the double lock structure. Moreover, since the employment of the double lock structure allows a connecter lock structure to be eliminated from the imaging module 10, downsizing of the cable connection structure in the imaging module 10, that is, downsizing of the imaging module 10 body in the on-vehicle camera can be achieved.

Furthermore, as described in the present embodiment, with the constitution in which the connector plug 21 is attached and fixed to the connector attaching portion 50 separately from the attachment and fixing of the imaging module 10 to the module attaching portion 40, the attachment and fixing of the connector plug 21 to the connector attaching portion 50, that is, incorporation of the cable part 20 into the bracket part 32 can be realized irrespective of mounting or non-mounting of camera, and a case where retrofitting work of the on-vehicle camera is performed can be dealt with only by addition of the imaging module 10 and change in the exterior covers 71, 72, resulting in the simplification of the retrofitting work.

In addition, in the camera mounting structure described in the present embodiment, in the double lock structure of the imaging module 10 and the connector plug 21, the constitution is such that the attaching direction when the imaging module 10 is attached to the module attaching portion 40 and the attaching direction when the connector plug 21 is attached to the connector attaching portion 50 are different from each other. More specifically, the respective attaching directions are constituted so as to be substantially perpendicular to each other. Accordingly, for example, even if load on the connector plug 21 occurs when the imaging module 10 is attached, the load is received by the holding portion 51 of the connector attaching portion 50, so that it does not act along the attaching direction of the connector plug 21. Therefore, as compared with the case where the respective attaching directions coincide, this camera mounting structure is greatly preferable for sufficiently assuring the load bearing strength around the cable.

Moreover, in the camera mounting structure described in the present embodiment, the constitution is such that the imaging module 10 is attached and fixed to the module attaching portion 40 utilizing the engagement between the claw portions 13, 45 and the receiving portions 15, 43, and that the connector plug 21 is also attached and fixed to the connector attaching portion 50 utilizing the engagement between the claw portions 23 and the receiving portions 52. Accordingly, the respective attachment and fixing can be performed by so-called one-touch operation respectively without requiring a special tool or the like, which is very effective to achieving easy and efficient work for the attachment and fixing. In addition, since for the attachment and fixing, space for screw cramp or the like need not be assured, dealing with the downsizing becomes much easier as compared with the case where the space assurance is necessary.

Moreover, in the camera mounting structure described in the present embodiment, the constitution is such that the bracket part 32 formed for mounting the on-vehicle camera, and the claw portions 13, 45 in the bracket part 32 or the receiving portions 15, 43, 52 have shapes enabling the rear garnish 30 and the bracket part 32 to be formed by molding processing of one step. Accordingly, as compared with a case where molding processing of a plurality of steps is required, it becomes easier to improve production efficiency of the rear garnish 30 and reduce a component cost.

Moreover, as described in the present embodiment, in the case where the exterior cover 72 for covering the imaging module 10 attached and fixed to the bracket part 32 is attached, if the rib-shape portions 73 as the deformation-movement restraining means for the receiving portions 43 and the claw portion 45 are formed in the exterior cover 72, the rib-shaped portions 73 restrain the deflection of the receiving portions 43 or the claw portion 45, thereby preventing the imaging module 10 from slipping off from the module attaching portion 40. Therefore, for example, even if vibration is applied due to vehicle traveling or the like, a situation where the influence causes the imaging module 10 to slip off and cause imaging trouble can be prevented in advance, which can assure reliability as an on-vehicle camera.

While in the present embodiment, specific examples of the preferred embodiment of the present invention have been described, the present invention is not limited to the contents, but modifications can be made as necessary in a range not departing from the gist thereof.

For example, while in the present embodiment, the double lock structure in which the attachment and fixing of the imaging module 10 to the module attaching portion 40 and the attachment and fixing of the connector plug 21 to the connector attaching portion 50 are performed separately, and once they are attached and fixed respectively, the electrical connection between the connector receptacle 14 and the connector plug 21 is assured has been described as an example, the double lock structure is not a requisite structure, but even in the case of a structure where the cable part 20 is directly fixed to the imaging module 10 as in a related art structure, the integral molding of the bracket part 32 with the rear garnish 30 can realize the simplification, the versatility assurance and the like of the on-vehicle camera mounting structure.

Moreover, while in the present embodiment, the back camera mounted on the rear garnish 30 of the vehicle as the on-vehicle camera has been described as an example, the present invention is not limited to this, but obviously, the present invention can also be applied to an on-vehicle camera mounted on another exterior panel component similar to the case of the present embodiment, and not to mention, the present invention is applicable.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2007-291469 filed in the Japanese Patent Office on Nov. 9, 2007, the entire content of which being incorporated herein by reference.

What is claimed is:

1. A camera mounting structure for mounting an on-vehicle camera on a vehicle, wherein;
   the on-vehicle camera includes an imaging module having a lens and an imaging element, and
   a bracket part arranged in an exterior panel component making up an exterior of the vehicle, the bracket part for holding the imaging module therein via a first snap-fit latch structure and for holding therein an electric connector plus of the vehicle via a second snap-fit latch structure, the bracket part is molded integrally with the exterior panel component as a portion of the exterior panel component.

2. The camera mounting structure according to claim 1, wherein;
   one side of the imaging module and the bracket part are provided with claw portions, and another side is provided with receiving portions to be engaged with the claw portions, and the engagement between the claw portions and the receiving portions allows the imaging module to be attached and fixed to the bracket part.

3. The camera mounting structure according to claim 2, wherein;
   the bracket part and the claw portions or the receiving portions in the bracket part have shapes enabling the exterior panel component and the bracket part to be formed by molding processing of one step.

4. The camera mounting structure according to claim 2, wherein;
   an exterior cover that covers the imaging module attached and fixed to the bracket part is attached in a formation position of the bracket part in the exterior panel component, and
   in the exterior cover, deformation-movement restraining means for the claw portions or the receiving portions is formed.

5. A camera mounting method for mounting an on-vehicle camera on a vehicle, comprising the steps of:
   constructing the on-vehicle camera so as to include an imaging module having a lens and an imaging element;
   molding a bracket part for holding the imaging module therein via a first snap-fit latch structure and for holding therein an electric connector plug of the vehicle via a second snap-fit latch structure, to an exterior panel component making up an exterior of the vehicle integrally with the exterior panel component as a portion of the exterior panel component; and
   attaching and fixing the imaging module inside the bracket part to thereby mount the on-vehicle camera on the vehicle.

6. An exterior panel component making up an exterior of a vehicle, wherein;
   a bracket part for holding therein via a first snap-fit latch structure an imaging module of an on-vehicle camera having a lens and an imaging element and for holding therein an electric connector plug of the vehicle via a second snap-fit latch structure, the bracket part is molded integrally with the exterior panel component as a portion of the exterior panel component.

* * * * *